J. A. McANULTY.
VEHICLE SPRING AND SHOCK ABSORBER.
APPLICATION FILED AUG. 2, 1915.
1,194,303.
Patented Aug. 8, 1916.
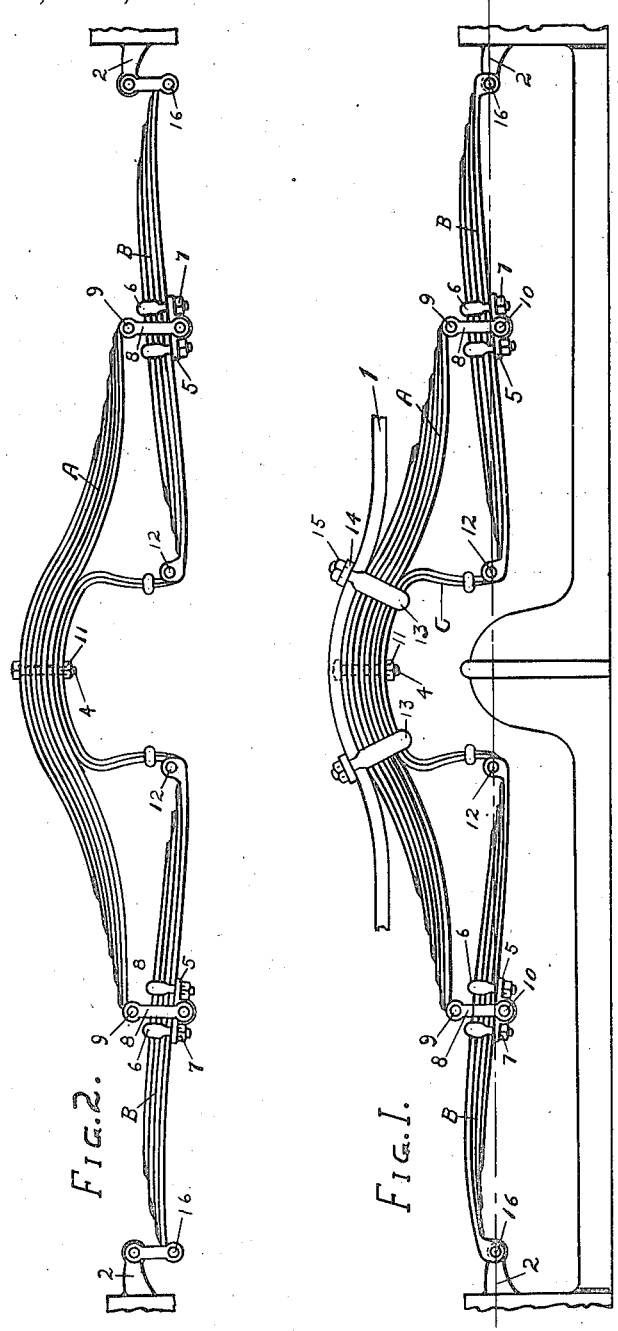
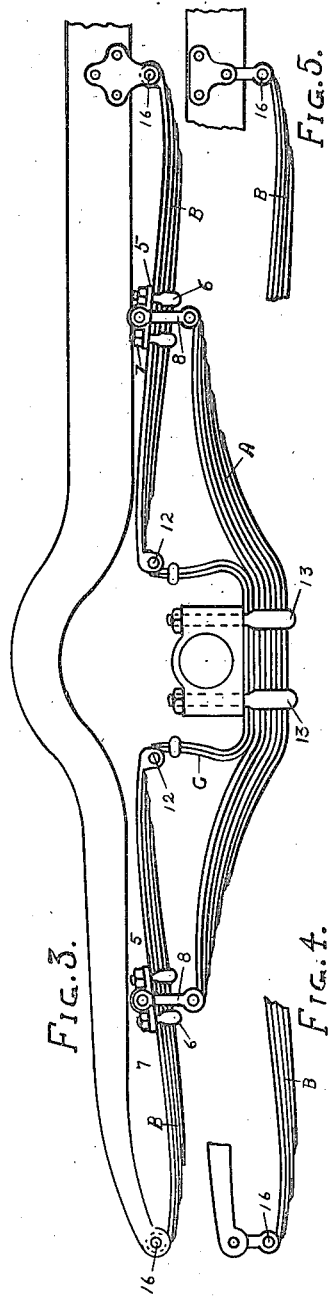
WITNESSES:
Daniel Mather
Kenneth F. Mather.
INVENTOR
John A. McAnulty
BY
ATTORNEY

UNITED STATES PATENT OFFICE.

JOHN A. McANULTY, OF INDIANAPOLIS, INDIANA.

VEHICLE-SPRING AND SHOCK-ABSORBER.

1,194,303.

Specification of Letters Patent.

Patented Aug. 8, 1916.

Application filed August 2, 1915. Serial No. 43,289.

*To all whom it may concern:*

Be it known that I, JOHN A. MCANULTY, now residing at Indianapolis, in the county of Marion and State of Indiana, have invented certain new and useful Improvements in Vehicle-Springs and Shock-Absorbers, of which the following is a specification.

The object of my invention is to combine in one spring suspension unit an easy riding spring and shock absorber, applicable alike to cross and side spring vehicles. This object is obtained through the medium of a main spring, having lever springs hinged to its ends connecting the central part of the main spring with one end of lever springs.

This invention is designed as an improvement upon Letters Patent No. 1060788 granted to me on the 6th day of May, 1913.

In the drawings:—Figure 1 is an elevation of my invention used as a combined spring and shock absorber on an end spring vehicle. Fig. 2 an elevation of the same used only as an easy riding spring on an end spring vehicle. Fig. 3 is an elevation of my invention used as a spring on a side spring vehicle. Figs. 4 and 5 an elevation of the same used as an easy riding spring only on a side spring vehicle.

The numeral 1 represents a member of a vehicle body to which springs are to be attached and 2 represents the brackets commonly used on vehicle axles or hubs to which the outward ends of springs are hinged or shackled by links and bolts.

A represents a main or fulcrum spring formed of a number of leaves of spring steel having tie bolt holes through the central part of each. The main leaf of spring A projects outward and terminates in eyes or hinge bolt holes. B B represents lever springs, each formed of a number of leaves of spring steel, having tie bolt holes through their central parts. The lower or main leaves of the springs B B have eyes or hinge bolt holes formed in both ends. The central part of the springs B B are fitted with clip plates 5 which are clamped to the springs by means of bifurcated clips 6 which encompass the leaves of the spring with their threaded ends thrust through bolt holes in the clip plates, said ends being provided with clamping nuts 7. Links 8 upon either side of the springs and clip plates, hinge the outward ends of the spring A to the clip plates attached to the springs B B when fitted with hinge bolts 9 and 10, forming a hinge connection of the outward ends of springs A with the central part of the springs B B.

When the spring is to be used as a combined spring and shock absorber, the central part of the fulcrum spring is connected with the inward ends of the lever springs by means of a yoke C formed to fit under the fulcrum spring and made of one or more pieces of spring steel plate, having tie bolt holes through its central part and having its ends turned downward and terminating in eyes or hinge bolt holes. The central part of the yoke is clamped to the fulcrum spring by means of a tie bolt 4 which passes through the yoke and spring leaves and is clamped by means of a nut 11.

The eyes formed in the lower ends of the yoke C are hinged to the eyes formed in the inward ends of the lever springs by means of the hinge bolts 12. The fulcrum spring A, the lever springs B B, hinged together and the connecting yoke form a complete spring unit which connects a vehicle body with a vehicle axle or running gear, in this instance by clamping the fulcrum spring to the body member 1 by means of clips 13 which are formed to encompass the body member the fulcrum spring and the yoke, and having the extended ends of the clips pass through clip bars 14 and receive clamping nuts 15 which when drawn bind the spring unit to the vehicle body. The outward or extended ends of the lever springs are then hinged into the brackets 2 by means of hinge bolts 16.

The lever springs are preferably made so that normally the inward portions are straight from the eyes to the central clip plates.

While the outward parts which hinge to the fixed brackets connected with the axle brackets are curved downward slightly in order that when the springs are placed under compression as shown in Fig. 1, the curved part will elongate practically the same as the straight parts shorten.

In operation the weight of the load should depress the spring into the form shown in Fig. 1, in which it is seen that the hinge bolts connecting the two ends of each of the lever springs are on a horizontal line, the yoke C free from side strain and as the vehicle becomes overloaded or underloaded the axle raised or lowered by the wheels passing over uneven surfaces of the streets or roads this rising and falling causes strain to be put upon the lower ends of the yokes and the higher or lower the wheels go the greater the strain is placed upon the yoke ends preventing too great vertical movement and eliminating both the shock and rebound. The strength of the yoke C limits the vibration of the vehicle body relative to the axle preventing the body from lowering too greatly or rising to a height that might cause breaking of the springs during the rebound. This description applies to transverse spring suspension over the axle in which the lever springs hinge to fixed bearings upon the axle as shown in Fig. 1, and act as both spring and shock absorber. The hinging of the lever springs to the links commonly hinged to the fixed brackets on vehicle axles as shown in Figs. 2 and 4, constitutes an easy riding spring, less the shock absorption restraint. When the spring is used as an easy riding spring only the yoke C may be made of a casting or rigid metal.

The foregoing describes my invention used as a cross spring as shown in Figs. 1 and 2, yet its application to side spring vehicles only requires the turning of the spring unit upside down, and connecting the central part of the fulcrum springs to the vehicle axles and hinging the outward ends of the lever springs to the brackets provided on the vehicle body for spring connection, as shown in Fig. 3 for the combined spring and shock absorber, or by hinging the outward ends of the lever springs to the spring links commonly hinged to the brackets of the vehicle body, as shown in Figs. 4 and 5, for an easy riding spring.

What I claim as new and desire to secure by Letters Patent is:—

1. In a vehicle, the combination with the body and axle, of a pair of lever springs having their outer ends secured thereto, a bow spring adapted to have its central part secured to the body, means for connecting the ends of said bow spring to said lever springs, and a spring yoke having its central portion secured to said bow spring and its ends pivoted to the inner ends of said lever springs.

2. In a vehicle, the combination with the body and axle, of springs having their outer ends secured thereto, yielding means on said springs for securing them to the body, and a spring yoke secured to said yielding means having its ends pivoted to the inner ends of said springs.

JOHN A. McANULTY.